US007781528B2

United States Patent
Takehara et al.

(10) Patent No.: US 7,781,528 B2
(45) Date of Patent: Aug. 24, 2010

(54) POWER TRANSMISSION BELT (75) Inventors: Tsuyoshi Takehara, Hyogo (JP);
Nozomu Shigemitsu, Hyogo (JP);
Susumu Takaba, Hyogo (JP);
Toshimichi Takada, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 0 days.

(21) Appl. No.: 10/975,137

(22) Filed: Oct. 28, 2004

(65) Prior Publication Data
US 2005/0096433 A1 May 5, 2005

(30) Foreign Application Priority Data

| Oct. 31, 2003 | (JP) | ............... 2003-372685 |
| Oct. 31, 2003 | (JP) | ............... 2003-372729 |
| Sep. 16, 2004 | (JP) | ............... 2004-269208 |
| Sep. 16, 2004 | (JP) | ............... 2004-269211 |

(51) Int. Cl.
*C08F 8/00* (2006.01)
*F16G 1/28* (2006.01)
*F16G 5/00* (2006.01)

(52) U.S. Cl. .................. 525/194; 474/252; 474/265
(58) Field of Classification Search ............. 525/194; 474/252, 265
See application file for complete search history.

(56) References Cited

U.S. PATENT DOCUMENTS 4,247,652 A * 1/1981 Matsuda et al. ............. 521/95
5,093,426 A * 3/1992 Sakabe et al. ............... 525/223
5,418,272 A * 5/1995 Kawabata et al. ........... 524/436
6,669,591 B1 * 12/2003 Brinkman et al. ........... 474/264
2002/0187869 A1 * 12/2002 Martin et al. ............... 474/260
2004/0116605 A1 * 6/2004 Nishihara et al. ........... 525/192

FOREIGN PATENT DOCUMENTS

| JP | 11-349752 | 12/1999 |
| JP | 2001-173728 | 6/2001 |

OTHER PUBLICATIONS

Ernst Rohde "EVA elastomers—applications and opportunities for industrial rubber goods", Rubber World, May 1993.*

* cited by examiner

*Primary Examiner*—Milton I Cano
*Assistant Examiner*—Gennadiy Mesh
(74) *Attorney, Agent, or Firm*—Wood, Phillips, Katz, Clark & Mortimer (57) ABSTRACT

A power transmission belt having a body with a length, an inside, an outside, and laterally spaced side surfaces. The body has a first rubber composition that includes an organic peroxide used as a cross-linking agent and N,N'-m-phenylenedimaleimide and/or quinone dioxime in an amount of 0.5 to 13 parts by weight per 100 parts by weight of rubber components. The rubber components include (a) ethylene-vinyl ester copolymer and/or an ethylene-$\alpha,\beta$-unsaturated carboxylate copolymer, and (b) an ethylene $\alpha$-olefin rubber in a ratio of from 5:95 to 100:0 by weight.

9 Claims, 2 Drawing Sheets

200; POWER TRANSMISSION BELT

BACKGROUND OF THE INVENTION

1. Field of the Invention

This invention relates to power transmission belts and, more particularly, to a power transmission belt at least one of a) incorporating a load carrying member and b) having driving teeth thereon.

2. Background Art

The deterioration of rubber in an ozone atmosphere has been a problem in the power transmission belt area. Conventional belts made from natural rubber, styrene-butadiene rubber, chloroprene rubber, etc. are prone to cracking prematurely due to the deterioration of the rubber in these belts. Additionally, rubber compositions containing halogen, such as chloroprene, cause the generation of dioxin, which is undesirable from an environmental standpoint. Accordingly, the industry has looked towards making power transmission belts from rubber that does not contain halogen.

In response to this demand, ethylene α-olefin rubbers, such as an ethylene-propylene rubber (EPR) and ethylene-propylene-diene copolymer rubber (EPDM), have been considered recently to be viable alternatives to halogen-containing rubber. These compositions are desirable from the standpoint that they have good resistance to ozone and both heat and cold. Additionally, these polymers are relatively inexpensive. The use of these compositions is disclosed, for example, in JP-A-06/345,948 (Japanese Gazette).

However, adhesive properties of an ethylene α-olefin rubber, such as ethylene-propylene rubber, are not good. Consequently, there is a problem in terms of adhering this composition to fibrous materials, such as those in load carrying members.

In addition to less than desirable adhesive properties, these rubber compositions tend to exhibit a low tearing force, which tearing force is further lowered when a peroxide cross-linking agent is used. Problems that evidence themselves are popping of the load carrying member out of the belt, as the belt is run, and breakage of teeth with a toothed belt construction. The above problems may be alleviated to a certain extent by the use of a sulphur cross-linking agent. However, when a sulphur cross-linking agent is used, it is difficult to raise the degree of vulcanization to the extent desired. This may result in increase in abrasion on the belt in use. The use of EPDM, which has many double bonds in its molecules, while increasing the extent of vulcanization and thereby increasing the resistance to adhesive abrasion to a certain extent, tends to lower heat resistance for the rubber.

SUMMARY OF THE INVENTION

In one form, the invention is directed to a power transmission belt having a body with a length, an inside, an outside, and laterally spaced side surfaces. The body has a first rubber composition that includes an organic peroxide used as a cross-linking agent and N,N'-m-phenylenedimaleimide and/or quinone dioxime in an amount of 0.5 to 13 parts by weight per 100 parts by weight of rubber components. The rubber components include (a) ethylene-vinyl ester copolymer and/or an ethylene-α,β-unsaturated carboxylate copolymer, and (b) an ethylene α-olefin rubber in a ratio of from 5:95 to 100:0 by weight.

In one form, the body has at least one load carrying member at least partially embedded in the first rubber composition.

In one form, the body has a plurality of teeth spaced along the length of the body. The teeth may be spaced at regular intervals.

In one form, the plurality of teeth are defined at least in part by the first rubber composition.

In one form, the (a) ethylene-vinyl ester copolymer and/or ethylene-α-β-unsaturated carboxylate copolymer and (b) ethylene α-olefin rubber are present in an amount of 10:90 to 60:40 by weight in the first rubber composition.

In one form, the ethylene-vinyl ester copolymer is an ethylene-vinyl acetate copolymer.

In one form, the ethylene-α-β-unsaturated carboxylate copolymer is an ethylene-ethyl acrylate copolymer.

In one form, the amount of vinyl ester in the ethylene-vinyl ester copolymer is 30 to 70% by weight.

In one form, the quinone dioxime is benzoquinone dioxime.

DETAILED DESCRIPTION OF THE DRAWINGS

Figure 3:
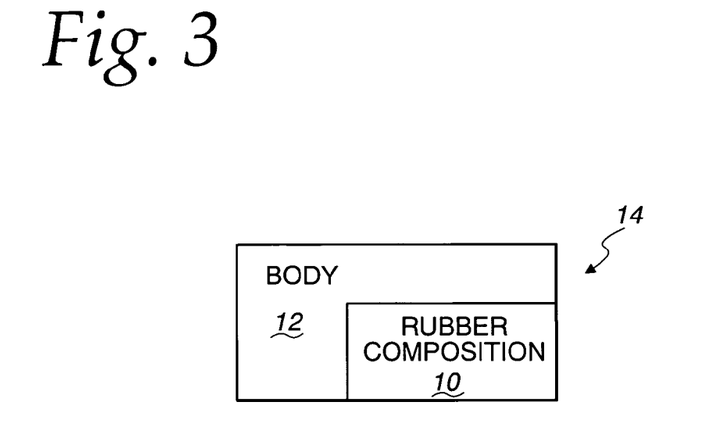
FIG. 3 is a schematic representation of a power transmission belt having a rubber composition, according to the present invention, incorporated therein.

As shown in FIG. 3, the invention contemplates use of a rubber composition 10 in the body 12 of a power transmission belt, shown generically at 14 in FIG. 3. A generic showing is made to encompass the virtually limitless number of different belt types and configurations encompassed by the present invention.

Figure 1:
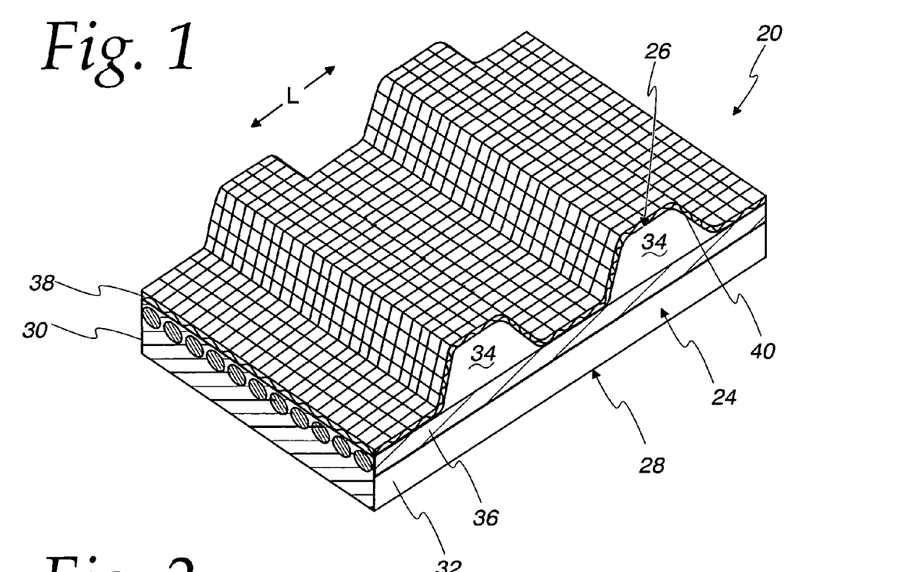
FIG. 1 is a fragmentary, perspective view of a toothed belt made according to the present invention.
Figure 2:
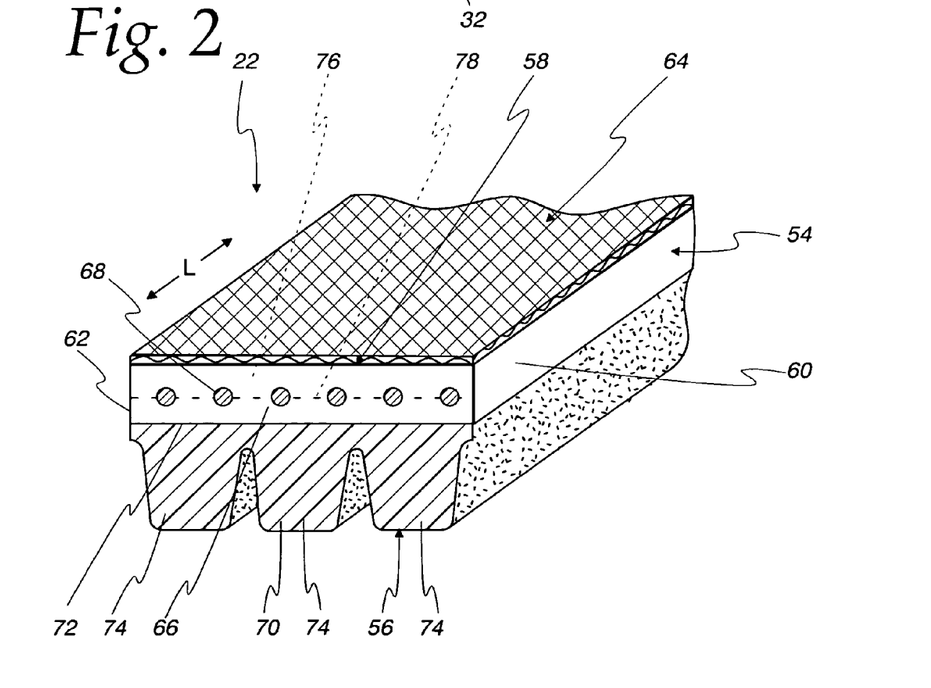
FIG. 2 is a fragmentary, perspective view of a V-ribbed belt, made according to the present invention.

The rubber composition 10 is shown incorporated into two exemplary power transmission belt types in FIGS. 1 and 2. More particularly, FIG. 1 is directed to a toothed power transmission belt at 20, with FIG. 2 showing a V-ribbed belt at 22. The specific configurations shown in FIGS. 1 and 2 are exemplary in nature only.

Referring initially to FIG. 1, the toothed power transmission belt 20 consists of a body 24 having a length, indicated by the double-headed arrow "L", an inside 26, an outside 28, and laterally spaced side surfaces 30,32. The inside 26 of the body 24 has a plurality of laterally extending teeth 34 spaced at regular intervals along the length of the body 24. At least one load carrying member 36, in this embodiment in the form of a cord, is embedded in the body 24 between the inside 26 and outside 28 thereof. A cloth layer 38 is adhered to an inside surface 40 of the body 24, including the teeth 34.

The load carrying cords 36 are commonly made from polybenzoxazole, poly-p-phenylene naphthalate, polyester, acrylate, carbon, steel, glass, aramid, etc. Glass fibers may be E glass or S glass, with the latter having high strength. There is no limitation as to the diameter of the filaments, the diameter or number of strands making up the filaments, or the number of filaments combined to produce the cords.

Preferably, the load carrying cords 36 are subjected to an adhesion treatment. In one such treatment, an untreated cord 36 is dipped into a tank containing a treating liquid that is one of an epoxy compound and an isocyanate compound. The dipped cord is then passed through a drying furnace maintained at 160° to 200° C. for 30 to 600 seconds. The cords 36 are then dipped in a tank containing an RFL adhesive liquid. The cords 36 are then directed through an elongation/thermal fixing device wherein the cords are elongated from −1 to 3% by passage for 30 to 600 seconds through the device in which the temperature is maintained in the range of 210° to 260° C.

Examples of the isocyanate compound used in the pretreating liquid are 4,4'-diphenylmethane diisocyanate, tolylene 2,4-diisocyanate, polymethylene polyphenyl diisocyanate, hexamethylene diisocyanate and polyallyl polyisocyanate (available commercially under the trademark PAPI). The isocyanate compound may be mixed with an organic solvent, such as toluene and methyl ethyl ketone.

A blocked polyisocyanate may be used where the above isocyanate compound is made to react with a blocking agent such as a phenol compound, tertiary alcohol or secondary alcohol so that an isocyanate group of the polyisocyanate is blocked.

Examples of the epoxy compound are a reaction product of polyhydric alcohol, such as ethylene glycol, glycerol and pentacrythritol, or a polyalkylene glycol, such as polyethylene glycol, with a halogen-containing epoxy compound such as epichlorohydrin and a reaction product of a polyhydric phenol such as resorcinol, bis(4-hydroxy-phenyl)dimethylmethane, phenol-formaldehyde resin and resorcinol-formaldehyde resin with a halogen-containing epoxy compound. The epoxy compound is mixed with an organic solvent, such as toluene and methyl ethyl ketone.

The RFL treating liquid may be a mixture of primary condensate of resorcinol with formaldehyde and a rubber latex. This composition enhances the adhesive force effectively when the molar ratio of resorcinol to formaldehyde is made from 1:2 to 2:1. When the molar ratio is less than 1:2, a reaction for making resorcinol-formaldehyde resin into a three-dimensional state may progress excessively to the point that a gel is formed. In an amount of greater than 2:1, the reaction of resorcinol with formaldehyde does not proceed to the same extent and the adhesive force may be undesirably low.

Examples of the rubber latex are a three-component copolymer of styrene-butadiene-vinylpyridine, hydrogenated nitrile rubber, chloroprene rubber and nitrile rubber.

A solid mass ratio of the primary condensate of resorcinol-formaldehyde to the above rubber latex is preferably from 1:2 to 1:8 to produce the desired increase in adhesive force. If the ratio is less than 1:2, the resin content of the resorcinol-formaldehyde may become too excessive to the point that an RFL coat becomes hard and dynamic adhesion is deteriorated. When the amount is more than 1:8, the resin amount of the resorcinol-formaldehyde may be too small such that the RFL coat is soft and the adhesive force is undesirably low.

A vulcanization accelerator or vulcanizing agent may be used. The vulcanization accelerator may be a sulfur-containing vulcanization accelerator, including thiazoles such as 2-mercaptobenzothiazole (M) and a salt thereof (such as zinc salt, sodium salt and cyclohexylamine salt) and dibenzothiazyl disulfide (DM), sulfenamides such as N-cyclohexyl-2-benzothiazyl sulfenamide (CS), thiurams such as tetramethylthiuram monosulfide (TS), tetramethylthiuram disulfide (TT) and dipentamethylenethiuram tetrasulfide (TRA), and dithiocarbamates such as sodium di-n-butyldithiocarbamate (TP), zinc dimethyldithiocarbamate (PZ) and zinc diethyldimethyldithiocarbamate (EZ).

Examples of suitable vulcanizing agents are sulfur, metal oxide (such as zinc oxide, magnesium oxide and lead oxide) and peroxide. The vulcanizing agent may be used together with the above-described vulcanization accelerator.

At least a part of each tooth 34 is made from the rubber composition 10, as described hereinbelow. The rubber composition 10 has rubber components containing a) ethylene-vinyl ester copolymer and/or ethylene-$\alpha$-$\beta$-unsaturated carboxylate copolymer, and b) ethylene $\alpha$-olefin rubber in a ratio of from 5:95 to 100:0 by weight in the rubber composition. More preferably, the range is from 10:90 to 60:40 to maximize resistance to tooth breakage.

What is intended by the description that the a) ethylene-vinyl ester copolymer and/or ethylene-$\alpha$-$\beta$-unsaturated carboxylate copolymer and b) ethylene $\alpha$-olefin rubber are contained in an amount of 100:0 means that ethylene-vinyl ester copolymer and/or ethylene-$\alpha$-$\beta$-unsaturated carboxylate copolymer are used, but there is no ethylene $\alpha$-olefin rubber. It has been found that the use of this rubber composition 10 in the teeth 34 of a belt, such as that shown at 20 in FIG. 1, accounts for good resistance to tooth breakage and an adequately long belt life.

The ethylene $\alpha$-olefin rubber is a copolymer of ethylene with $\alpha$-olefin (propylene, butane, hexane, or octane) or a copolymer of ethylene with the above $\alpha$-olefin and a non-conjugated diene. Specific examples thereof are an ethylene-propylene rubber (EPM) and an ethylene-propylene-diene copolymer (EPDM). Examples of the above diene component are non-conjugated dienes having 5 to 15 carbon atoms, such as ethylidene norbornene, dicyclopentadiene, 1,4-hexadiene, cyclooctadiene and methylene norbornene.

When the hydrocarbon of the ester is long in the ethylene-vinyl ester copolymer and in the ethylene-$\alpha$-$\beta$-unsaturated carboxylate copolymer, the relative amount of the ester bonds decreases and polarity becomes low. Thus it is preferable that the hydrocarbon be as short as possible. Examples of vinyl ester of the ethylene-vinyl ester copolymer are vinyl propionate, vinyl acetate, vinyl caproate, vinyl caprylate, vinyl laurate and vinyl stearate. Of these, vinyl acetate or an ethylene-vinyl acetate copolymer (EVA) are preferred. If an ethylene-vinyl ester copolymer is selected and the amount of vinyl ester is present in an amount of 30 to 70% by weight, it has been found that resistance to tearing is good, as are adhesive properties. As a result, toothed belts incorporating this composition may have good resistance to tooth breakage and an adequate running life.

When the amount of vinyl ester is less than 30% by weight, the resistance to tooth breakage may be unacceptably low. Further, the running life for the belt may become unacceptably shortened.

If the amount of vinyl ester is greater than 70% by weight, the rubber elasticity may be significantly diminished. The belts may be prone to deformation and unacceptable changes in size. As a result, the belt life may be adversely lowered beyond what is acceptable.

Examples of $\alpha,\beta$-unsaturated carboxylate in the ethylene-$\alpha$-$\beta$-unsaturated carboxylate copolymer are methyl acrylate, ethyl acrylate, methyl methacrylate and ethyl methacrylate. Among these, ethyl acrylate or an ethylene-ethyl acrylate copolymer (EEA) are preferred.

With respect to the copolymers, they are not limited to only one, and it is contemplated that two or more may be mixed. If the aim is to maximize adhesive properties, it is desirable to select an ethylene-vinyl ester copolymer.

In the rubber composition 10, organic peroxide is used as a cross-linking agent. Examples of organic peroxides are dicumyl peroxide, di-tert-butyl peroxide, tert-butylcumyl peroxide, benzoyl peroxide, 1,3-bis(tert-butylperoxyisopropyl)benzene, 2,5-dimethyl-2,5-di(tert-butyl-peroxy)hexyne-3,2,5-dimethyl-2,5-(benzoyl-peroxy)hexane and 2,5-dimethyl-2,5-mono(tert-butylperoxy)-hexane. The organic peroxide is used preferably within a range of 0.5 to 8 parts by weight per 100 parts by weight of rubber, that may be made from one component, or a mixture of multiple components.

In the rubber composition, preferably 0.5 to 13 parts by weight of N,N'-m-phenylenedimaleimide and/or quinone dioxime are mixed for each 100 parts by weight of the rubber component(s). N,N'-m-phenlylenedimaleimide and quinone dioxime act as co-cross-linking agents. When present in an amount of less than 0.5 parts by weight, the effects resulting from the use thereof may not be significant. When the amount is more than 13 parts by weight, it was found that the resistance to tearing diminishes. Further adhesive properties were found to lower significantly.

When N,N'-m-phenylenedimaleimide is used as a co-cross-linking agent, the cross-linking density becomes high. When quinone dioxime is used, good resistance to tearing has been noted.

Examples of quinone dioxime are p-benzoquinone dioxime, p,p'-dibenzoquinone dioxime and tetrachlorobenzoquinone poly(p-dinitrobenzoquinone). Among these, benzoquinone dioximes, such as p-benzoquinone dioxime and p,p'-dibenzoquinone dioxime, are preferred when adhesive properties and cross-linking density are taken into consideration.

In addition to the above components, a reinforcing agent such as carbon black and silica, a filler such as calcium carbonate and talc, a plasticizer, a stabilizer, a processing aid, and/or a coloring agent may be used in the rubber composition.

It is preferred that the entire exposed area of the teeth 34 at the side surfaces 30,32 be made from the above-described rubber composition 10. Preferably, the rubber composition of the entire belt body 12 is made using the above-described rubber composition 10. When the belt 20 is made by a compression molding process, the teeth 34 and back side of the belt, within which the load carrying cords 36 are embedded, may be made from the same sheet having the same composition. However, it is also contemplated that the teeth 34, such as at the side surfaces 30,32, may be made from the rubber composition 10, while portions outside of the teeth 34 on the belt body 24 be made from another composition. As an example, the rubber composition in which the load carrying cords 36 are embedded may be made from a different rubber composition than the rubber composition 10.

When adhesion to fiber material, such as the load carrying cords 36 and the cloth layer 38 are focused upon, it is desirable that the rubber layer contacting the fiber material in these components be made from a rubber composition in which a) an ethylene-vinyl ester copolymer and/or an ethylene-α-β-unsaturated carboxylate, and b) an ethylene α-olefin rubber be present in a ratio of 5:95 to 100:0 in the rubber components of the rubber composition 10.

It is further preferred that an organic peroxide be present as a cross-linking agent and that 0.5 to 13 parts by weight of N,N'-m-phenylenedimaleimide and/or quinone dioxime be present in an amount of 0.5 to 13 parts by weight for 100 parts by weight of the rubber component(s). With this composition, it has been found that the rubber composition 10 is positively adhered to the fiber material. For example, with this rubber composition, it has been found that the teeth 34 positively adhere to the cloth layer 38. Similarly, when the load carrying cords 36 are embedded in this rubber composition 10, it has been found that adhesion between the rubber composition and load carrying cords 36 is good.

Other rubber compositions defining part or all of the body 24 may be used. As examples, ethylene α-olefin rubber may be used alone as a rubber component. Alternatively, an additional rubber may be used in conjunction with the ethylene α-olefin rubber. This additional rubber may be one or a combination of butadiene rubber (BR), styrene-butadiene rubber (SBR), nitrile rubber (NBR), hydrogenated nitrile rubber (H-NBR), chloroprene rubber (CR), butyl rubber (IIR) and natural rubber (NR).

The cloth layer 38 may be canvas selecting from plain fabric, twilled fabric, satin fabric, etc. With respect to a woof for the fabric, arranged in a lengthwise direction of the belt body 24, it is preferred that it contain 20 to 80% by weight (to the total amount of the woof in the longitudinal direction of the belt) of multifilament yarn with joined para-type aramid fiber of 0.3 to 1.2 denier.

Thus, the woof is a yarn containing a multifilament yarn of para-type aramid fiber, with the multifilament of the para-type aramid fiber also capable of containing a yarn made up of a meta-type aramid fiber. One specific woof constitution consists of three types of yarns mixed together—multifilament yarn of a para-type aramid fiber, spun yarn made of a meta-type aramid fiber, and urethane elastic yarn.

Another specific construction of the woof may be one wherein three types of yarns are combined together—multifilament yarn of a para-type aramid fiber, aliphatic fiber (Nylon 6, Nylon 66, polyester, polyvinyl alcohol, etc.), and urethane elastic yarn.

The warp for the cloth layer 38 may be made from filament yarn of aramid fiber made from a para-type aramid fiber and a meta-type aramid fiber or filament yarn of polyamide, such as Nylon 6, Nylon 66 or Nylon 12, polyvinyl alcohol and polyester. When a multifilament yarn of aramid fiber, with a multifilament in which filaments made from yarns of para-type aramid fiber is used, generally rigidity is well balanced and a tooth cloth layer 38 with a uniform thickness results.

The materials for the warp and weft in the cloth layer 38 are not limited to those described above. There is virtually no limitation with respect to these yarns. Cords, nonwoven fabric, knitted cloth, etc. may be utilized. It is preferred that the adhesion rubber be attached to the cloth layer 38 by means of soaking, spreading, coating, etc.

The rubber composition 10 is incorporated into the V-ribbed belt 22 in FIG. 2 as follows. The belt 22 has a body 54 having a length extending in the direction, indicated by the double-headed arrow "L", an inside 56, an outside 58 and laterally spaced side surfaces 60,62. The outside 58 of the body 54 is covered by a cloth layer 64.

The body 54 is defined by multiple layers, in this case an elastic cushion rubber layer 66 in which at least one load carrying member, in this case at least one carrying cord 68, is embedded. A compression rubber layer 70 is adhered to the inside 72 of the cushion rubber layer 66. The compression rubber layer 70 is formed to define laterally spaced ribs 74. The number of ribs 74 and their configuration is not critical to the present invention. In this case, the ribs 74 have a trapezoidal cross-sectional shape. Each rib 74 extends the full lengthwise extent of the body 54.

In the embodiment shown, the cushion rubber layer 66 is defined by the rubber composition 10. However, different shapes and combinations of components are contemplated. As one alternative construction, the belt may be made without a single cushion rubber layer 66, as shown, within which the load carrying cords 68 are embedded at an intermediate location between the inside and outside thereof. The cloth layer 64 may also be eliminated.

As an example of this modified type of construction, the load carrying cords 68 may be embedded between the compression rubber layer 70 and a layer 76 outside of the load carrying cords 68, that is in tension. That is, with this alternative construction, the load carrying cords 68 are embedded in a region defined by an outward extension of the compression rubber layer 70, or a separate layer, and the layer 76 in tension outside of the neutral axis for the belt, as indicated by the dotted line 78.

With this construction, when the focus is on the adhesive properties between the load carrying cords 68 and the rubber composition in the body 54, it is preferable that the extension of the compression rubber layer 70, or a separate layer between the compression rubber layer 70 and the neutral axis 78, be made with the rubber composition 10 without any short reinforcing fibers therein. Similarly, it is desirable that the optional tension layer 76 be made from the rubber composition 10 without any short reinforcing fibers therein.

The load carrying cords 68 may be made from polyethylene terepthalate fiber, polyethylene napthalate fiber, polytrimethylene terephthalate fiber, polybutylene terephthalate fiber, glass fiber or aramid fiber. The glass fiber may be E glass or S glass, with the latter having high strength. There are no limitations in terms of the diameter of the filaments, the number or diameter of strands in each filament, or the numbers of filaments combined to produce the cords. It is preferred that the load carrying cords 68 be treated in a manner as described with respect to the load carrying cords 36, above.

Preferably, at least the rubber composition in which the load carrying cords 68 are embedded is made from the rubber composition 10, as described in detail above. If the rubber composition 10 contains a) an ethylene-vinyl ester copolymer and/or an ethylene-α-β-unsaturated carboxylate copolymer, and b) an ethylene α-olefin rubber as rubber components in a ratio by weight from 5:95 to 100:0, and more preferably from 10:90 to 60:40, a well balanced modulus, and good resistance to tearing and good adhesive properties have been found to result. That is, there is good adhesion between the rubber composition 10 and the load carrying cords 68 and good resistance to tearing.

When an ethylene-vinyl ester copolymer is selected, with vinyl ester being the in range of 30 to 70% by weight, it has been found that resistance to tearing is good, as are the adhesive properties between the rubber composition 10 and the loading carrying cords 68 and cloth layer 64. When the amount is less than 30% by weight, resistance to tearing and adhesive properties are diminished appreciably. When the amount is more than 70% by weight, the elasticity of the rubber is diminished, with the effects described with respect to the power transmission belt 14 resulting.

It is preferred that the rubber composition 10 define at least the rubber in which the at least one load carrying cord 68 is embedded. However, the invention contemplates that all rubber compositions in the belt body 54 may be defined by the rubber composition 10, described above. On the other hand, it is also contemplated that other rubber in the belt may be made from compositions different than for the rubber composition 10. As an example, the compression rubber layer 70 may be made from a rubber composition that is different than the rubber composition 10. That is, the compression rubber layer 70 may be made from the rubber composition 10, or a different composition.

Since the rubber composition 10 has good adhesive properties with respect to fiber materials, it is desirable to use the rubber composition 10 to adhere the cloth layer 64 to the remainder of the body 54.

As with the power transmission belt 14, a rubber composition other than the rubber composition 10 may be used for the main body 54. A single rubber component, such as ethylene α-olefin rubber may be used and/or may be blended with another type of rubber, such as at least one of butadiene rubber (BR), styrene-butadiene rubber (SBR), nitrile rubber (NBR), hydrogenated nitrile rubber (H—NBR), chloroprene rubber (CR), butyl rubber (IIR) and natural rubber (NR).

The cloth layer 64 may be made the same as, or differently than, the cloth layer 38, previously described.

The cloth layer 64 may be a fiber substrate selected from textile, knitted material, nonwoven fabric, etc. The fibers used may be any of those in the group consisting of cotton and linen, inorganic fiber such as metal fiber and glass fiber and organic fiber such a polyamide, polyester, polyethylene, polyurethane, polystyrene, polyfluoroethylene, polyacrylate, polyvinyl alcohol, all-aromatic polyester and aramid. In the case of textile, the yarn therefor is preferably subjected to plain weaving, twilling, staining, etc. processes to produce a woven product.

It is preferred that the above cloth layer 64 be dipped in resorcinol-formaldehyde-latex liquid (RFL liquid), as known in the art. After dipping in the RFL liquid, friction coating may be accomplished by rubbing a non-vulcanized rubber into the cloth layer 64. Alternatively, the cloth 64 may be subjected to a soaking treatment in a liquid wherein rubber is dissolved in a solvent. The RFL liquid may be mixed with a carbon black solution, so that the resulting layer is stained to a black color. Alternatively, the RFL liquid may be mixed with 0.1 to 5.0% by mass of a known surfactant.

As noted previously, the belt 14 is not limited to the toothed belt 20 or V-ribbed belt 22 depicted. Other belts, such as plain belts, etc., are suitable for incorporation of the present invention, utilizing the basic inventive concepts, described above. The belts 14,20,22 can be used in virtually any environment, such as on driving devices for automobiles, for industrial use, etc.

It has been found that toothed belts, made using the rubber composition 10 to form the teeth thereof, exhibit good resistance to tooth breakage and tend to have an adequate life. Additionally, none of the rubber components—ethylene-vinyl ester copolymer, ethylene-α-β-unsaturated carboxylate copolymer, and ethylene α-olefin rubber, contains halogen, thereby addressing environmental concerns.

Good resistance to tooth breakage and adequate belt life have been found to result using the above-described belt constructions. The selection of benzoquinone dioxime as the quinone dioxime has been found to improve resistance to tooth breakage.

Belts using this same rubber composition to engage load carrying members/cords and cover layers have exhibited good integrity and resistance to tearing. That is the resistance to popping out of the load carrying members/cords is good as is the adherence of the rubber composition to the cover layers.

The use of the rubber component(s) in the above-described range has been found to account for a good balance between modulus, tear resistance and adhesion.

The use of benzoquinone dioxime as the dioxime accounts for good belt hardness and adhesion to load carrying members/cords and covering layers.

The effectiveness of the use of the present invention in belts, with a toothed construction, will now be described with respect to specific operating examples.

Nylon tooth cloth was wound on a metal mold with an associated toothed die surface. Glass, load carrying cords, subjected to an adhesive treatment, were wound in a spiral pattern, with a predetermined pitch and with a predetermined tension, over the cloth. A rubber layer, having the composition shown in Table 1, below, was applied over the load carrying cords.

TABLE 1

| (Part(s) by Weight) | Inventive Examples | | | | | | | | | |
|---|---|---|---|---|---|---|---|---|---|---|
| | 1 | 2 | 3 | 4 | 5 | 6 | 7 | 8 | 9 | 10 |
| EPDM*1 | 95 | 70 | 50 | 50 | — | 70 | 70 | 70 | 70 | 70 |
| EVA*2 | 5 | 30 | 50 | 50 | 100 | 30 | 30 | — | 30 | 30 |
| EVA*3 | — | — | — | — | — | — | — | — | — | — |
| EVA*4 | — | — | — | — | — | — | — | — | — | — |
| EEA*5 | — | — | — | — | — | — | — | 30 | — | — |
| Zinc oxide | 5 | 5 | 5 | 5 | 5 | 5 | 5 | 5 | 5 | 5 |
| Carbon black*6 | 50 | 50 | 50 | 50 | 50 | 50 | 50 | 50 | 50 | 50 |
| Stearic acid | 1 | 1 | 1 | 1 | 1 | 1 | 1 | 1 | 1 | 1 |
| Plasticizer | 10 | 10 | 10 | 10 | 10 | 10 | 10 | 10 | 10 | 10 |
| Organic Peroxide*7 | 2 | 2 | 2 | 2 | 2 | 2 | 2 | 2 | 2 | 2 |
| Co-cross-linking agent A*8 | 1 | 1 | 1 | — | 1 | 5 | 10 | 1 | — | — |
| Co-cross-linking agent B*9 | — | — | — | — | — | — | — | — | — | — |
| Co-cross-linking agent C*10 | — | — | — | 1 | — | — | — | — | 5 | 1 |
| Co-cross-linking agent D*11 | — | — | — | — | — | — | — | — | — | — |
| Co-cross-linking agent E*12 | — | — | — | — | — | — | — | — | — | — |
| Tensile strength (N/4 mmm) | 1041 | 1005 | 1032 | 1021 | 1035 | 1050 | 1010 | 1078 | 1066 | 1014 |
| Tooth shear strength (N/4 mmm) | 303 | 317 | 337 | 333 | 305 | 321 | 311 | 249 | 435 | 435 |
| Duration (h) to Trouble | 500■ | ← | ← | ← | ← | ← | ← | 385▲ | 500■ | ← |

| | Inventive Examples | | | | | Comparative Examples | | | |
|---|---|---|---|---|---|---|---|---|---|
| | 11 | 12 | 13 | 14 | 15 | 1 | 2 | 3 | 4 |
| EPDM*1 | 70 | 70 | 70 | 70 | 70 | 70 | 70 | 100 | 100 |
| EVA*2 | 30 | — | 30 | 30 | — | 30 | 30 | — | — |
| EVA*3 | — | — | — | — | 30 | — | — | — | — |
| EVA*4 | — | 30 | — | — | — | — | — | — | — |
| EEA*5 | — | — | — | — | — | — | — | — | — |
| Zinc oxide | 5 | 5 | 5 | 5 | 5 | 5 | 5 | 5 | 5 |
| Carbon black*6 | 50 | 50 | 50 | 50 | 50 | 50 | 50 | 50 | 50 |
| Stearic acid | 1 | 1 | 1 | 1 | 1 | 1 | 1 | 1 | 1 |
| Plasticizer | 10 | 10 | 10 | 10 | 10 | 10 | 10 | 10 | 10 |
| Organic Peroxide*7 | 2 | 2 | 2 | 2 | 2 | 2 | 2 | 2 | 2 |
| Co-cross-linking agent A*8 | — | — | — | — | 5 | — | 15 | 2 | — |
| Co-cross-linking agent B*9 | — | — | — | — | — | 1 | — | — | — |
| Co-cross-linking agent C*10 | — | — | — | — | — | — | — | — | 1 |
| Co-cross-linking agent D*11 | 1 | 1 | — | — | — | — | — | — | — |
| Co-cross-linking agent E*12 | — | — | 5 | 1 | — | — | — | — | — |
| Tensile strength (N/4 mmm) | 1003 | 1047 | 1085 | 1056 | 1011 | 1024 | 1031 | 998 | 1015 |
| Tooth shear strength (N/4 mmm) | 323 | 308 | 303 | 299 | 296 | 293 | 156 | 190 | 231 |
| Duration (h) to Trouble | ← | ← | ← | ← | 361▲ | 192▲ | 216◆ | 240▲ | 216▲ |

▲ = detachment of load carrying cord
◆ = tooth breaking
■ = no trouble
*1: "EPT" manufactured by Mitsui Chemicals;
*2: "Levapren 600 HV" manufactured by Bayer, containing 60 wt % of vinyl acetate;
*3: "Ultrasene 7A55A" manufactured by Tosoh, containing 17 wt % of vinyl acetate;
*4: "Lavapren 450" manufactured by Bayer, containing 45 wt % of vinyl acetate;
*5: "NUC" manufactured by Nippon Unica, containing 20 wt % of ethyl acrylate;
*6: GPF carbon black;
*7: 40 wt % of 1,3-bis(tert-butylperoxy-isopropyl)benzene and 60 wt % of calcium carbonate;
*8: N,N'-m-phenhylenedimaleimide;
*9: TAIC (Triallyl isocyanurate);
*10: p,p'-Dibenzoquinone dioxime;
*11: p-Benzoquinone dioxime;
*12: Poly-p-dinitrobenzene The resulting preassembly was then placed in a vulcanization kettle and subjected to pressure vulcanization at 165° C. for 30 minutes through a conventional press fit system. The outside of the belt was then abraded to a predetermined thickness. The preassembly was then cut into predetermined widths to prepare test belts. Each resulting belt was a 3M tooth type, with a tooth pitch of 5 mm, with 60 teeth, and a belt width of 6 mm.

Figure 4:
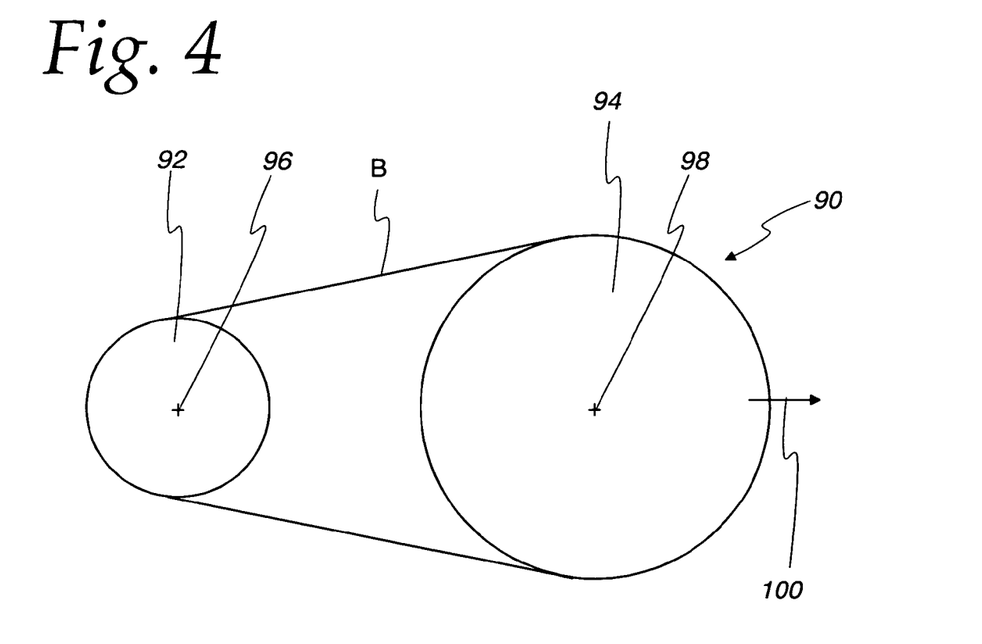
FIG. 4 is a schematic representation of a system for dynamically testing the properties of the inventive power transmission belts.

The results of static, physical property tests and running tests at an ambient temperature of 23° C. are set out in Table 1, above. The system used to dynamically test the belts is shown at 90 in FIG. 4. The belts B were trained around drive and driven pulleys 92,94, respectively, which were rotated around parallel axes 96,98. The drive pulley 92 had 22 teeth, with the driven pulley 94 having 40 teeth. A force of 2.4 kgf was applied to the driven pulley 94 in the direction of the arrow 100, with a load of 390 W applied. The drive pulley 92 was operated at 3600 rpm.

Tensile strength was measured under conditions with a tensile rate of 50 mm/minute by an autograph tester. Tooth shear strength was measured under conditions with a shear rate of 50 mm/minute by an autograph tester using a tooth-shaped jig.

As seen in Table 1, with Comparative Example 1, where TAIC was used as a co-cross-liking agent, the tooth shear strength was low and separation of the load carrying cords at an early stage was detected.

With Comparative Example 2, where not less than a desired amount of maleimide was used, the tooth sheer strength was significantly decreased to the extent that it had no practical utility.

In Comparative Examples 3 and 4, where EPDM, which was an ethylene α-olefin, was used as the sole rubber component, shear strength was poor. By reason of separation of the load carrying cords, it was not possible to run to a finishing stage after 500 hours.

With the Inventive Examples, tooth shear strength was high, evidencing a good static physical property.

In the running tests, the Inventive Examples also showed an apparent improvement in durability as compared with the Comparative Examples. It was found that the EVA-compounded systems showed a particularly significant improved effect in the tooth shear strength and in longevity. Further, a mixture of EVA and EPDM in the specific ratio resulted in good tooth shear strength.

It was also found that, with the EVA, with ethylene controlled within a specific range, the tooth shear strength was further improved and the running life was adequately long.

Further, it was found that with the Inventive Examples, with benzoquinone dioxide, the quinone dioxime-compounded systems showed better tooth shear strength.

The effectiveness of the inventive rubber composition 10, in terms of adhesion, particularly with respect to the load carrying cords, will now be described with respect to specific examples.

The physical properties of non-vulcanized rubber, with a rubber composition as shown in Table 2, below, and the physical properties of vulcanized rubber, which were subjected to a press process at 165° C. for 30 minutes, were measured.

TABLE 2

(Part(s) by Weight)

| | Inventive Examples | | | | | | | | | | | | | | | Comparative Examples | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 1 | 2 | 3 | 4 |
| EPDM*1 | 95 | 70 | 50 | 50 | — | 70 | 70 | 70 | 70 | 70 | 70 | 70 | 70 | 70 | 70 | 70 | 70 | 100 | 100 |
| EVA*2 | 5 | 30 | 50 | 50 | 100 | 30 | 30 | — | 30 | 30 | 30 | — | 30 | 30 | — | 30 | 30 | | |
| EVA*3 | — | — | — | — | — | — | — | — | — | — | — | — | — | — | 30 | — | — | — | — |
| EVA*4 | — | — | — | — | — | — | — | — | — | — | — | 30 | — | — | — | — | — | — | — |
| EEA*5 | — | — | — | — | — | — | — | 30 | — | — | — | — | — | — | — | — | — | — | — |
| Zinc oxide | 5 | 5 | 5 | 5 | 5 | 5 | 5 | 5 | 5 | 5 | 5 | 5 | 5 | 5 | 5 | 5 | 5 | 5 | 5 |
| Carbon black*6 | 50 | 50 | 50 | 50 | 50 | 50 | 50 | 50 | 50 | 50 | 50 | 50 | 50 | 50 | 50 | 50 | 50 | 50 | 50 |
| Stearic acid | 1 | 1 | 1 | 1 | 1 | 1 | 1 | 1 | 1 | 1 | 1 | 1 | 1 | 1 | 1 | 1 | 1 | 1 | 1 |
| Plasticizer | 10 | 10 | 10 | 10 | 10 | 10 | 10 | 10 | 10 | 10 | 10 | 10 | 10 | 10 | 10 | 10 | 10 | 10 | 10 |
| Organic Peroxide*7 | 2 | 2 | 2 | 2 | 2 | 2 | 2 | 2 | 2 | 2 | 2 | 2 | 2 | 2 | 2 | 2 | 2 | 2 | 2 |
| Co-cross-linking agent A*8 | 1 | 1 | 1 | — | 1 | 5 | 10 | 1 | — | — | — | — | — | — | 5 | — | 15 | 2 | — |
| Co-cross-linking agent B*9 | — | — | — | — | — | — | — | — | — | — | — | — | — | — | — | 1 | — | — | — |
| Co-cross-linking agent C*10 | — | — | — | 1 | — | — | — | — | 5 | 1 | — | — | — | — | — | — | — | — | 1 |
| Co-cross-linking agent D*11 | — | — | — | — | — | — | — | — | — | — | 1 | 1 | — | — | — | — | — | — | — |
| Co-cross-linking agent E*12 | — | — | — | — | — | — | — | — | — | — | — | — | 5 | 1 | — | — | — | — | — |

*1: "EPT" manufactured by Mitsui Chemicals;
*2: "Levapren 600 HV" manufactured by Bayer, containing 60 wt % of vinyl acetate;
*3: "Ultrasene 7A55A" manufactured by Tosoh, containing 17 wt % of vinyl acetate;
*4: "Lavapren 450" manufactured by Bayer, containing 45 wt % of vinyl acetate;
*5: "NUC" manufactured by Nippon Unica, containing 20 wt % of ethyl acrylate;

TABLE 2-continued (Part(s) by Weight)

|  | Inventive Examples | | | | | | | | | | | | | | | Comparative Examples | | | |
|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 1 | 2 | 3 | 4 |

\*6: GPF carbon black;
\*7: 40 wt % of 1,3-bis(tert-butylperoxy-isopropyl)benzene and 60 wt % of calcium carbonate;
\*8: N,N'-m-phenylenedimaleimide;
\*9: TAIC (Triallyl isocyanurate);
\*10: p,p'-Dibenzoquinone dioxime;
\*11: p-Benzoquinone dioxime;
\*12: Poly-p-dinitrobenzene.

Viscosity, hardness, 100% modulus/breaking tenacity/breaking elongation and tear were evaluated in accordance with JIS K 6300, JIS K 6253, JIS K 6251 and JIS K 6252, respectively. Test pieces were prepared according to JIS K 6250.

Glass fiber cord, subjected to an adhesion treatment process, was placed at a width of 25 mm on a rubber sheet having the composition shown in Table 2, and have a 4 mm thickness, pressed with a pressure of 2.0 Mpa using a press plate and vulcanized at 165° C. for 30 minutes to prepare a sample for the adhesion test. Each sample was measured for its adhesive force according to JIS K 6256. The results are shown in Table 3, below.

More specifically, in the systems where EVA was used, a significant improved effect was noted for adhesive properties. So long as EVA and EPDM were mixed in specific ratios, modulus, adhesive properties, and resistance to tearing were well balanced.

It was further found that when EVA was used, with the amount of ethylene in a specific range, adhesive properties and resistance to tear were further improved.

It was further found that, with the Inventive Examples, where benzoquinone dioxime was selected from among the quinone dioxime-compounded systems, rubber hardness was high and adhesive properties were good.

TABLE 3

|  | Inventive Examples | | | | | | | | | | | | | | | Comparative Examples | | | |
|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 1 | 2 | 3 | 4 |
| Viscosity (125° C.) | 38.9 | 41.2 | 21.6 | 25.6 | 25.9 | 35.1 | 41.1 | 40.1 | 43.1 | 42.2 | 43.4 | 39.8 | 42.5 | 38.6 | 37.9 | 34.3 | 41.5 | 42.1 | 45.1 |
| Hardness | 68 | 69 | 69 | 68 | 66 | 71 | 76 | 68 | 70 | 69 | 70 | 68 | 68 | 66 | 67 | 68 | 87 | 68 | 63 |
| 100% Modulus (MPa) | 4.2 | 4.7 | 4.5 | 4.3 | 3.1 | 5.0 | 8.3 | 4.5 | 4.9 | 4.0 | 4.8 | 3.8 | 4.3 | 3.7 | 4.2 | 4.5 | — | 4.0 | 3.1 |
| Breaking tenacity (MPa) | 12.6 | 13.7 | 15.8 | 16.3 | 13.3 | 13.5 | 12.6 | 13.5 | 15.1 | 15.5 | 13.6 | 14.3 | 12.7 | 15.6 | 13.6 | 11.3 | 13.5 | 10.9 | 12.5 |
| Breaking elongation (%) | 244 | 278 | 376 | 356 | 631 | 200 | 120 | 250 | 279 | 256 | 286 | 301 | 296 | 312 | 224 | 145 | 51 | 314 | 402 |
| Tear JISA (N/mm) | 30.1 | 34.1 | 34.0 | 37.9 | 52.0 | 35.4 | 30.5 | 35.1 | 39.1 | 37.4 | 40.1 | 46.0 | 39.6 | 45.9 | 20.1 | 25.1 | 18.4 | 23.5 | 28.1 |
| Adhesive force (N/25 mm) | 205 | 228 | 240 | 236 | 251 | 223 | 213 | 150 | 258 | 225 | 210 | 205 | 201 | 198 | 135 | 113 | 35 | 57 | 63 |

In Comparative Example 1, where TAIC was used as a co-cross-linking agent, elongation and tear tenacity of the vulcanized rubber were low, and adhesion to the load carrying cords was poor.

In Comparative Example 2, where not less than an appropriate amount of N,N'-m-phenylenedimaleimide was mixed as a co-cross-linking agent, tear tenacity and adhesive properties were significantly lower and made the composition impractical for use.

In Comparative Examples 3 and 4, where EPDM, which was an ethylene α-olefin, was used alone, the adhesion to the load carrying cords was extremely low.

With the Inventive Examples, the resistance to tear was improved compared to the Comparative Examples. Similarly, the adhesive forces were better than for the Comparative Examples.

While the invention has been described with particular reference to the drawings, it should be understood that various modifications could be made without departing from the spirit and scope of the present invention.

The invention claimed is:

1. A power transmission belt comprising:
  a body having a length, an inside, an outside, and laterally spaced side surfaces, the body comprising a first rubber composition with rubber components and at least one load carrying member at least partially embedded in the first rubber composition,
  the first rubber composition comprising an organic peroxide used as a cross-linking agent and quinone dioxime in an amount of 0.5 to 13 parts by weight per 100 parts by weight of rubber components, the rubber components comprising (a) ethylene-vinyl acetate copolymer and (b) an ethylene α-olefin rubber in a ratio of from 10:90 to 60:40 by weight,
wherein the amount of vinyl acetate in the ethylene-vinyl acetate copolymer is 30 to 70% by weight, and wherein tensile strength of said belt is at least from about 1000 to about 1090 N/6 mm.

2. The power transmission belt according to claim 1 wherein the quinone dioxime comprises benzoquinone dioxime.

3. The power transmission belt according to claim 1 wherein the body comprises a plurality of teeth spaced along the length of the body.

4. The power transmission belt according to claim 3 wherein the first rubber composition defines at least a part of the plurality of teeth.

5. The power transmission belt according to claim 4 wherein the teeth are spaced at regular intervals along the length of the body.

6. The power transmission belt according to claim 4 wherein the quinone dioxime comprises benzoquinone dioxime.

7. The power transmission belt according to claim 1, wherein the first rubber composition further comprises zinc oxide, carbon black, and a plasticizer.

8. The power transmission belt according to claim 7, wherein the organic peroxide is at about 2 parts by weight of the rubber components; zinc oxide is at about 5 parts by weight of the rubber components; carbon black is at about 50 parts by weight of the rubber components; the plasticizer is at about 10 parts by weight of the rubber components; and quinone dioxime is between about 1 and about 5 parts by weight of the rubber components.

9. The power transmission belt according to claim 8, further comprising stearic acid.

* * * * *